United States Patent
Haneda et al.

(10) Patent No.: US 7,207,590 B2
(45) Date of Patent: Apr. 24, 2007

(54) TOWING HOOK MOUNTING STRUCTURE FOR VEHICLE

(75) Inventors: Shinichi Haneda, Anjo (JP); Kazunari Azuchi, Himi (JP); Taku Matsutani, Toyama-ken (JP); Jun Shobo, Himi (JP)

(73) Assignees: Aisin Seiko Kabushiki Kaisha, Kariya-shi, Aichi-ken (JP); Aisin Keikinzoku Kabushiki Kaisha, Shinminato-shi, Toyama-ken (JP)

( * ) Notice: Subject to any disclaimer, the term of this patent is extended or adjusted under 35 U.S.C. 154(b) by 170 days.

(21) Appl. No.: 11/114,104

(22) Filed: Apr. 26, 2005

(65) Prior Publication Data

US 2005/0236809 A1  Oct. 27, 2005

(30) Foreign Application Priority Data

Apr. 27, 2004  (JP) ............................. 2004-132060

(51) Int. Cl.
  *B60D 1/00*  (2006.01)
(52) U.S. Cl. ...................................... 280/495; 403/187
(58) Field of Classification Search ................ 280/495, 280/491.5, 505, 515; 293/117; 403/187
  See application file for complete search history.

(56) References Cited

U.S. PATENT DOCUMENTS 2,693,369 A * 11/1954 Gross ......................... 280/502
3,929,354 A * 12/1975 Elkins ....................... 280/490.1
5,054,806 A * 10/1991 Chester ....................... 280/495
5,716,155 A *  2/1998 Yoshida et al. ............. 403/187
6,604,884 B1   8/2003 Ohkura
6,896,281 B2 *  5/2005 Lenzen et al. ............... 280/495
7,137,658 B2 * 11/2006 Haneda et al. .............. 293/117
2002/0140206 A1* 10/2002 Lloyd ....................... 280/491.5

FOREIGN PATENT DOCUMENTS

| JP | 2002-053066 | 2/2002 |
| JP | 2003-002136 | 1/2003 |

* cited by examiner

*Primary Examiner*—Tony Winner
(74) *Attorney, Agent, or Firm*—Finnegan, Henderson, Farabow, Garrett & Dunner, LLP.

(57) ABSTRACT

A towing hook mounting structure for a vehicle comprises a bumper reinforcement extending in a width direction of the vehicle and including a front surface, a back surface, a top surface and an under surface, a hook mounting member to which a towing hook is fixed, a mechanical fastening means for fastening the bumper reinforcement and the hook mounting member on at least one of the top surface or the under surface of the bumper reinforcement a bumper engaging portion formed on the bumper reinforcement so as to protrude toward the back surface of the bumper reinforcement, a hook engaging portion formed on the hook mounting member protruding toward a front surface of the hook mounting member so as to be engaged with the bumper engaging portion, and a contacting portion formed on the hook mounting member so as to make contact with the back surface of the bumper reinforcement.

19 Claims, 3 Drawing Sheets

US 7,207,590 B2

TOWING HOOK MOUNTING STRUCTURE FOR VEHICLE

This application is based on and claims priority under 35 U.S.C. § 119 to Japanese Patent Application 2004-132060, filed on Apr. 27, 2004, the entire content of which is incorporated herein by reference.

FIELD OF THE INVENTION

The present invention relates to a towing hook mounting structure for a vehicle.

BACKGROUND

Known towing hook mounting structures for a vehicle are disclosed in, for example JP2003-2136A (FIG. 2), JP2002-53066A (FIG. 2) and U.S. Pat. No. 6,604,884B1. These known towing hook mounting structures for a vehicle have different structures. However, a mounting position of a towing hook in each of these structures is set in accordance with an engaging portion between a side member and a bumper reinforcement.

In the mounting structures disclosed in JP2003-2136A and JP2002-53066A, because the towing hook is mounted on a front surface of a side member (side frame), the design of the side member has been limited. Further, according to the mounting structure disclosed in U.S. Pat. No. 6,604,884B1, a plate (hook mounting nut 17) into which the towing hook is screwed is inserted into a bumper reinforcement, and the towing hook is mounted to the plate. Thus, taking into consideration of ease of assembly, the position of the plate is limited to near an end portion of the bumper reinforcement, and further, the mounting position of the towing hook to the plate is also limited to near the end portion of the bumper reinforcement. Thus, the design of the side member has also been limited.

Thus, a need exists for providing a towing hook mounting structure for a vehicle in which the design of a side member is not limited, and in which appropriate levels of strengths of a bumper reinforcement and a hook mounting member can be appropriately secured. The present invention has been made in view of the above circumstances and provides such a towing hook mounting structure.

SUMMARY OF THE INVENTION

According to an aspect of the present invention, a towing hook mounting structure for a vehicle comprises a bumper reinforcement extending in a width direction of the vehicle and including a front surface, a back surface, a top surface and an under surface, a hook mounting member to which a towing hook is fixed, a mechanical fastening means for fastening the bumper reinforcement and the hook mounting member on at least one of the top surface or the under surface of the bumper reinforcement a bumper engaging portion formed on the bumper reinforcement so as to protrude toward the back surface of the bumper reinforcement, a hook engaging portion formed on the hook mounting member protruding toward a front surface of the hook mounting member so as to be engaged with the bumper engaging portion, and a contacting portion formed on the hook mounting member so as to make contact with the back surface of the bumper reinforcement.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
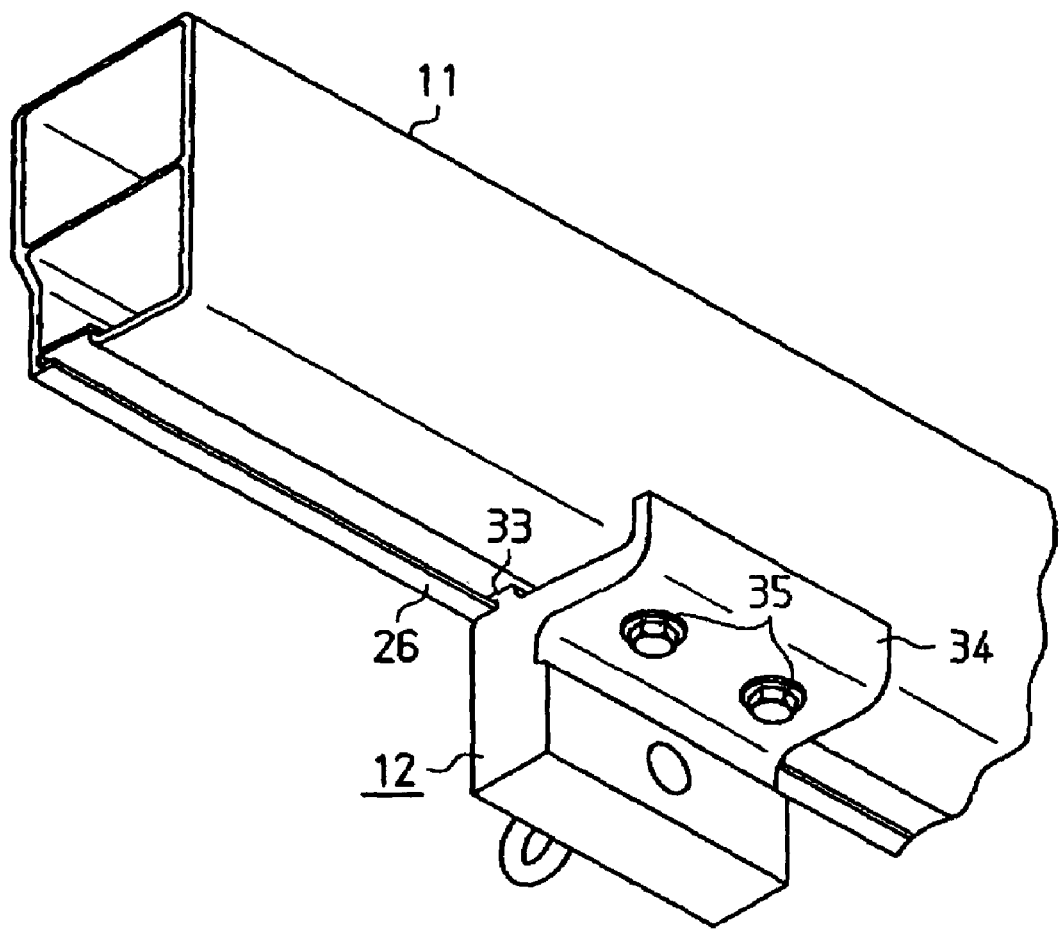
FIG. 1 illustrates a perspective view indicating an embodiment according to the present invention.
Figure 2:
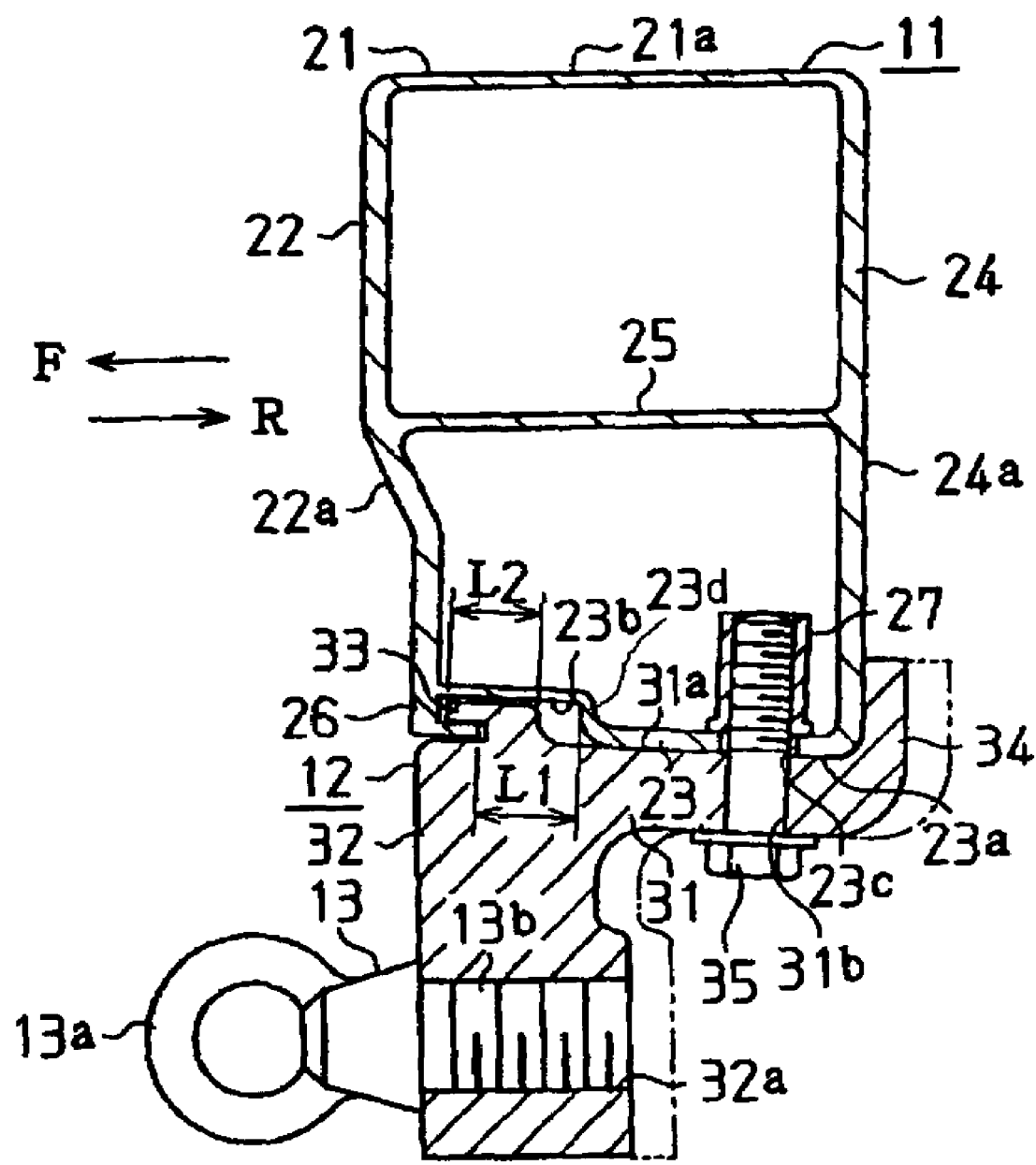
FIG. 2 illustrates a cross section of the embodiment shown in FIG. 1.

An embodiment according to the present invention will be explained in accordance with FIG. 1 and FIG. 2. FIG. 1 illustrates a perspective view indicating a mounting structure in this embodiment in which a towing hook is mounted to a front portion (front side) of a vehicle, and FIG. 2 illustrates a cross section indicating the mounting structure. An arrow F in FIG. 2 indicates a front direction of the vehicle, and an arrow R in FIG. 2 indicates a rear direction of the vehicle, and a direction that is perpendicular to the page of FIG. 2 indicates a width direction of the vehicle.

As shown in FIG. 2, a bumper reinforcement 11 is formed of, for example an aluminium base alloy, by extrusion so as to have a constant cross section, and is provided along the width direction of the vehicle. A hook mounting nut 12, serving as a hook mounting member, is connected to the bumper reinforcement 11, and a towing hook 13 is fixed to the hook mounting nut 12.

Specifically, as shown in FIG. 2, the bumper reinforcement 11 includes two vertical walls (a front wall portion 22 and a rear wall portion 24) and two horizontal walls (an upper wall portion 21 and a bottom wall portion 23) and forms a hollowed-rectangular shape in its cross section. The bumper reinforcement 11 further includes a dividing wall 25 that separates a central portion of the front wall portion 22 and a central portion of the rear wall portion 24 so as to form a hollow divided into two connected hollows. Thus, an outer surface of the upper wall portion 21 is a top surface 21a of the bumper reinforcement 11, an outer surface of the front wall portion 22 is a front surface 22a of the bumper reinforcement 11, an outer surface of the bottom wall portion 23 is an under surface 23a of the bumper reinforcement 11 and an outer surface of the rear wall portion 24 is a back surface 24a of the bumper reinforcement 11. In this embodiment, the front surface 22a, corresponding to a front end surface (outer surface) as one directly faces the vehicle at the front end, is know as the front side.

A recessed portion 23b is formed on the bottom wall portion 23 at the front wall portion 22 side. Specifically, the recessed portion 23b is recessed toward the dividing wall 25 continuously as far as the front wall portion 22. A vertical inner wall 23d is provided between a rear end of the recessed portion 23b and a front end of the bottom wall portion 23. Further, a bumper engaging portion 26 is formed on the front wall portion 22 so as to extend in a downward direction at a distance that corresponds to a gap between the recessed portion 23b and the bottom wall portion 23, and then the bumper engaging portion 26 is bent in a longitudinal direction of the back surface 24a. Thus, the level of the outer surface of the bumper engaging portion 26 becomes identical to the under surface 23a.

A bottom hole portion 23c is formed on a central portion between the recessed portion 23b of the bottom wall portion 23 and the rear wall portion 24, as shown in FIG. 2, and a caulking nut 27 comprising a mechanical fastening means is concentrically fixed to the bottom hole portion 23c. The caulking nut 27 is a known nut that penetrates through the bottom hole portion 23c from the outside of the bottom wall portion 23 and is engaged with the under surface 23a at one end of the caulking nut 27, and which is also engaged with the inner surface of the bottom wall portion 23, so as to be prevented from being removed from the bottom hole 23a.

The hook mounting nut 12 is formed of, for example an aluminium base alloy by extrusion so as to have a constant cross section. The hook mounting nut 12 includes a supporting wall portion 31 and a hook mounting wall portion 32.

The supporting wall portion 31 is positioned along the bottom wall portion 23 (the under surface 23a) of the bumper reinforcement 11, and the hook mounting wall portion 32 extends downward from a front end portion of the supporting wall portion 31. A hook engaging portion 33 is formed on the supporting wall portion 31. Specifically, the hook engaging portion 33 protrudes upwards from the top surface 31a, and then bends towards the front surface 22a so as to be engaged with the bumper engaging portion 26.

In such a configuration, a distance in a longitudinal direction between the end portion of the bumper engaging portion 26 and the vertical inner wall 23d is indicated by a distance L1, and a length of the hook engaging portion 33 is indicated by a distance L2. The distance L1 is set to be longer than the distance L2, and thus, the engaging portion 33 can be inserted into the recessed portion 23b from underneath so as not to interfere with the end portion of the bumper engaging portion 26. Further the supporting wall portion 31 is moved towards the front wall 22 so as to be engaged with the bumper engaging portion 26.

A rear contacting portion 34 (contacting portion) is formed at the rear portion of the supporting wall portion 31 so as to extend upward continuously from an end portion of the supporting wall portion 31. The rear contacting portion 34 is formed in such a way that, when the bumper engaging portion 26 is engaged with the hook engaging portion 33, the rear contacting portion 34 remains in contact with the back surface 24a at a front surface thereof. Thus, the hook engaging portion 33 protrudes in a direction perpendicular to the extending direction of the rear contacting portion 34, in other words, in a direction that differs from a direction of the rear contacting portion 34.

Further, a bolt through hole portion 31b is formed on the supporting wall portion 31. When the bumper engaging portion 26 is engaged with the hook engaging portion 33, the bolt through hole portion 31b is positioned coaxially the bottom hole portion 23c (the caulking nut 27). In such configurations, a fastening bolt 35 serving as a mechanical fastening means is screwed into the caulking nut 27 through the bolt through hole portion 31b and the bottom hole portion 23c.

Thus, when the hook mounting nut 12 is fastened to the bumper reinforcement 11 by means of the mechanical fastener, the bumper engaging portion 26 engages with the hook engaging portion 33, and, at the same time, the rear contacting portion 34 remains in contact with the back surface 24a.

A female screw portion 32a opening in a longitudinal direction of the vehicle is formed on the hook mounting wall portion 32. The towing hook 13 is screwed into the female screw portion 32a so as to be fixed to the hook mounting nut 12.

Specifically, the towing hook 13 includes a ring-shaped hook portion 13a, with which a tow rope is engaged, and a male screw portion 13b. Thus, the towing hook 13 is fixed to the hook mounting nut 12 in circumstances where the male screw portion 13b of the towing hook 13 is screwed into the female screw portion 32a, and the hook portion 13a of the towing hook 13 protrudes in a front direction of the vehicle. The towing hook 13 is attached to the hook mounting nut 12 only when the tow rope is engaged with the hook portion 13a so as to tow a vehicle, and in normal circumstances, the towing hook 13 is detached from the hook mounting nut 12.

(1) According to this embodiment, when a vehicle or the like is towed by means of the towing hook 13 that is pulled from the front surface 22a side, the pulling force applied to the hook mounting nut 12 is dispersed to the caulking nut 27 and the fastening bolt 35, which are mechanically fastened, and to the back surface 24a of the bumper reinforcement 11 and the front surface of the rear contacting portion 34, and finally the dispersed pulling force is transmitted to the bumper reinforcement 11. Thus, because the pulling force applied to the hook mounting nut 12 is dispersed, the strength of the bumper reinforcement 11 and the hook mounting nut 12, which can resist the pulling force transmitted to the bumper reinforcement 11, can be appropriately secured.

On the other hand, when the vehicle is in a tied-down state and the towing hook 13 is pulled from the front surface 22a side in a obliquely downward direction, the pulling force applied to the hook mounting nut 12 is dispersed to the caulking nut 27 and the fastening bolt 35, which are mechanically fastened, and to the engaging portion between the bumper engaging portion 26 and the hook engaging portion 33, and finally the dispersed pulling force is transmitted to the bumper reinforcement 11. Thus, because the pulling force applied to the hook mounting nut 12 when the vehicle is in a tied-down state is dispersed, the strengths of the bumper reinforcement 11 and the hook mounting nut 12, which can resist the pulling force transmitted to the bumper reinforcement 11, can be appropriately secured.

(2) According to this embodiment, because the bumper reinforcement 11 is formed by extrusion so as to have a constant cross section (excepting the bottom hole portion 23c), the bumper engaging portion 26 is formed over the entire length of the bumper reinforcement 11, the freedom of design in settling on a mounting position of the hook mounting nut 12 is therefore enhanced, and thus any restrictions on the design of the bumper reinforcement 11 can be effectively disregarded.

(3) According to this embodiment, the bumper reinforcement 11 and the hook mounting nut 12 can be easily formed by extrusion.

(4) According to this embodiment, the hook mounting nut 12 is fixed to the bumper reinforcement 11, but, because any modifications to the cross section of the bumper reinforcement 11 are marginal, the stiffness of the bumper reinforcement 11 cannot be adversely affected. Thus, when the vehicle collides with an object in front of the vehicle, the bumper reinforcement 11 is crushed and deformed in a longitudinal direction of the vehicle so as to absorb collision energy effectively.

(5) According to this embodiment, the towing hook 13 is directly screwed into the female screw portion 32a of the hook mounting nut 12, which is positioned immediately below the bumper reinforcement 11. Thus, in comparison with known mounting structures (JP2003-2136A, JP2002-53066A), in which the towing hook is penetrated into the bumper reinforcement so as to be screwed, the length to witch the hook portion 13a protrudes can be reduced. Further, when the vehicle, for example, is tied-down, the moment of force applied to the towing hook 13 (the hook portion 13a) can be moderated, as a result, the deformation of the towing hook 13 can be accordingly reduced.

(6) According to this embodiment, in order to secure strength of engagement between the hook mounting nut 12 and the bumper reinforcement 11, the hook mounting nut 12 is fixed to the bumper reinforcement 11 by means of an engaging structure (the bumper engaging portion 26, the hook engaging portion 33 and the like), to which stress is applied by means of the mechanical fastener (the caulking nut 27 and the fastening bolt 35).

Thus, when the bumper reinforcement and the hook mounting nut, made, for example, of an aluminium base alloy, are connected by welding, it is possible to avoid reductions in strength stemming from cracks caused by corrosion resulting from stress.

(7) According to this embodiment, the bumper reinforcement 11 and the hook mounting nut 12 are formed of an aluminium base alloy by molding. Thus, electric erosion occurring, for example, on an engaging portion between different kinds of metal, can be avoided.

The embodiment according to the present invention may be altered as follow.

Figure 3:
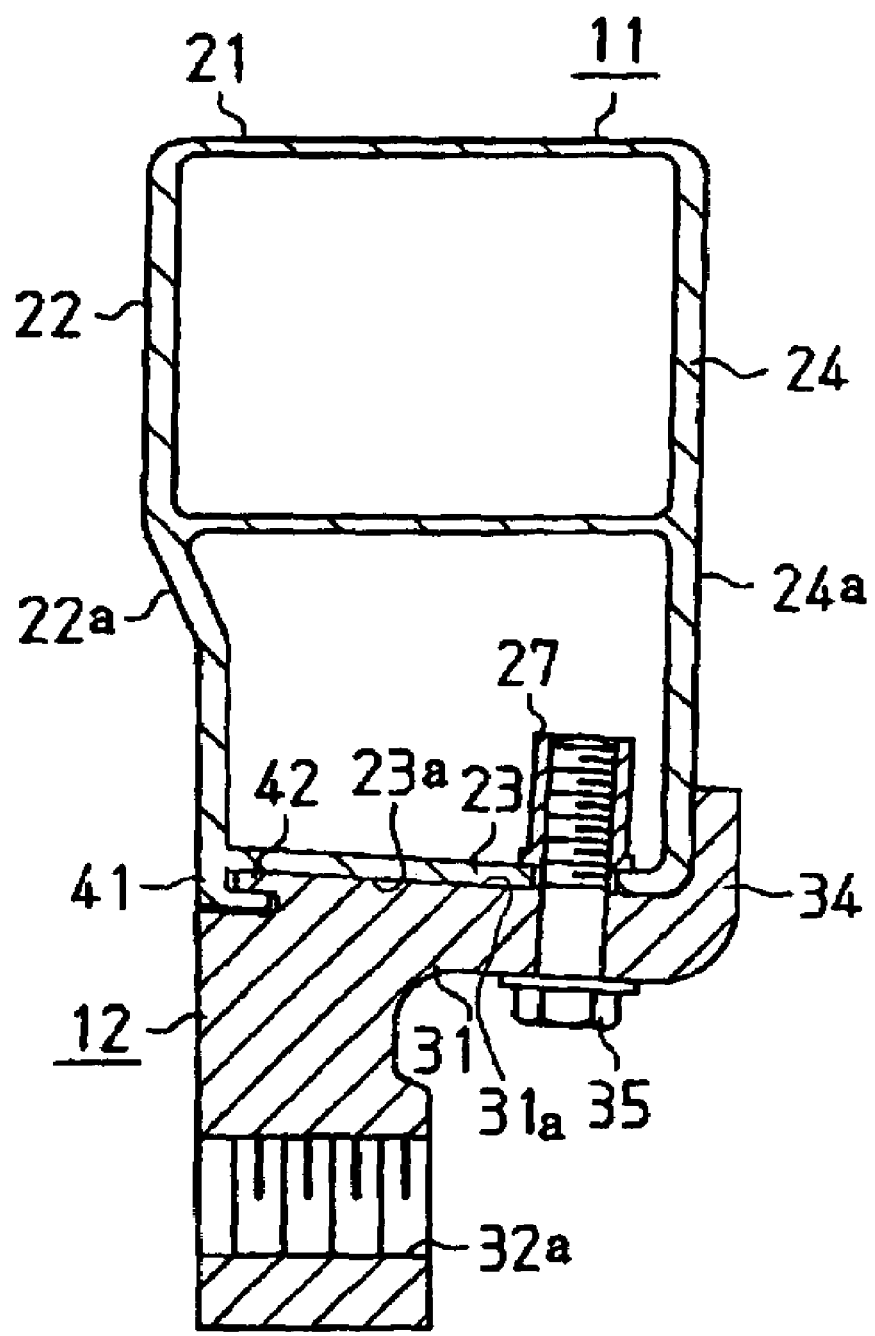
FIG. 3 illustrates a cross section of an alternative embodiment according to the present invention.

The shapes of the bumper engaging portion and the hook engaging portion may be modified, as shown in FIG. 3 that illustrates an alternative fitting structure. In this fitting structure, as shown in FIG. 3, a recessed portion 23b is not formed on a bottom wall portion 23 of a bumper reinforcement 11, and an under surface 23a is a flat surface. Further, the bumper engaging portion 41 is formed so as to protrude from the lower end portion of the front wall portion 22 and bend toward the back surface 24a. On the other hand, a hook engaging portion 42 is formed on a hook mounting nut 12. Specifically, a groove is formed on a front end portion of the supporting wall portion 31 so as to form the hook engaging portion 42, which protrudes towards a front surface 22a. The same effects can be obtained by this alternative fitting structure.

In such configurations, the bumper engaging portion 41 is engaged with the hook engaging portion 42 at in front of a mechanical fastening means (a caulking nut 27 and a fastening bolt 35). However, the bumper engaging portion 41 may be engaged with the hook engaging portion 42 at a central portion between the mechanical fastening means and the rear contacting portion 34.

Specifically, any configuration can be applied to the fitting structure as long as a bumper engaging portion is formed on the bumper reinforcement 11 so as to protrude toward the back surface 24a, and a hook engaging portion is formed on the hook mounting nut 12 so as to protrude toward the front surface 22a, and the bumper engaging portion is engaged with the hook engaging portion. More specifically, the bumper engaging portion may be formed on a top surface 21a so as to engaged with the hook engaging portion of the hook mounting nut 12. Further, a fastening position between the bumper reinforcement 11 and the hook mounting nut 12 is not limited to the under surface 23a of the bumper reinforcement 11. The fastening position may be on the top surface 21a.

A rivet may be used as the mechanical fastening means.

In the embodiment, the bumper reinforcement and the hook mounting nut may be formed by cutting. In such cases, the bumper engaging portion may not be formed within entire length of the bumper reinforcement. The bumper engaging portion may be formed only on a portion at which the hook mounting nut (towing hook) is supposed to be mounted.

In accordance with a designing purpose or a stroke of an extrusion, the bumper reinforcement may be cut into pieces, and then they may be connected appropriately so as to form, for example a curve portion.

This invention may be applied to a towing hook mounted to a rear portion of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A towing hook mounting structure for a vehicle comprising:
   a bumper reinforcement extending in a width direction of the vehicle and including a front surface, a back surface, a top surface and an under surface;
   a hook mounting member to which a towing hook is fixed;
   a mechanical fastening means for fastening the bumper reinforcement and the hook mounting member on at least one of the top surface or the under surface of the bumper reinforcement;
   a bumper engaging portion formed on the bumper reinforcement so as to protrude toward the back surface of the bumper reinforcement;
   a hook engaging portion formed on the hook mounting member protruding toward a front surface of the hook mounting member so as to be engaged with the bumper engaging portion, and
   a contacting portion formed on the hook mounting member so as to make contact with the back surface of the bumper reinforcement.

2. The towing hook mounting structure for a vehicle according to claim 1, wherein at least one of the bumper reinforcement and the hook mounting member is formed by means of extrusion.

3. The towing hook mounting structure for a vehicle according to claim 1, wherein the hook engaging portion protrudes in a direction perpendicular to a protruding direction of the contacting portion.

4. The towing hook mounting structure for a vehicle according to claim 3, wherein the hook engaging portion protrudes in a direction that is different from the protruding direction of the contacting portion.

5. The towing hook mounting structure for a vehicle according to claim 4, wherein a recessed portion is formed on the bumper reinforcement, and a length between a tip end of the bumper engaging portion and a vertical inner wall is superior to a length of the hook engaging portion.

6. The towing hook mounting structure for a vehicle according to claim 4, wherein the hook mounting member includes a supporting wall portion positioned along the under surface of the bumper reinforcement and a hook mounting wall portion extending continuously downward from a front end portion of the supporting wall portion.

7. The towing hook mounting structure for a vehicle according to claim 6, wherein the contacting portion is formed at a rear end portion of the supporting wall portion so as to protrude continuously upward from an end portion of the supporting wall portion.

8. The towing hook mounting structure for a vehicle according to claim 3, wherein a recessed portion is formed on the bumper reinforcement, and a length between a tip end of the bumper engaging portion and a vertical inner wall is superior to a length of the hook engaging portion.

9. The towing hook mounting structure for a vehicle according to claim 3, wherein the hook mounting member includes a supporting wall portion positioned along the under surface of the bumper reinforcement and a hook mounting wall portion extending continuously downward from a front end portion of the supporting wall portion.

10. The towing hook mounting structure for a vehicle according to claim 9, wherein the contacting portion is formed at a rear end portion of the supporting wall portion so as to protrude continuously upward from an end portion of the supporting wall portion.

11. The towing hook mounting structure for a vehicle according to claim 1, wherein the hook engaging portion protrudes in a direction that is different from a protruding direction of the contacting portion.

12. The towing hook mounting structure for a vehicle according to claim 11, wherein a recessed portion is formed on the bumper reinforcement, and a length between a tip end of the bumper engaging portion and a vertical inner wall is superior to a length of the hook engaging portion.

13. The towing hook mounting structure for a vehicle according to claim 11, wherein the hook mounting member includes a supporting wall portion positioned along the under surface of the bumper reinforcement and a hook mounting wall portion extending continuously downward from a front end portion of the supporting wall portion.

14. The towing hook mounting structure for a vehicle according to claim 13, wherein the contacting portion is formed at a rear end portion of the supporting wall portion so as to protrude continuously upward from an end portion of the supporting wall portion.

15. The towing hook mounting structure for a vehicle according to claim 1, wherein the hook mounting member is made of an aluminium base alloy.

16. The towing hook mounting structure for a vehicle according to claim 1, wherein the bumper reinforcement is made of an aluminium base alloy.

17. The towing hook mounting structure for a vehicle according to claim 1, wherein a recessed portion is formed on the bumper reinforcement, and a length between a tip end of the bumper engaging portion and a vertical inner wall is superior to a length of the hook engaging portion.

18. The towing hook mounting structure for a vehicle according to claim 1, wherein the hook mounting member includes a supporting wall portion positioned along the under surface of the bumper reinforcement and a hook mounting wall portion extending downward continuously from a front end portion of the supporting wall portion.

19. The towing hook mounting structure for a vehicle according to claim 18, wherein the contacting portion is formed at a rear end portion of the supporting wall portion so as to protrude continuously upward from an end portion of the supporting wall portion.

* * * * *